United States Patent
Nathanson et al.

(10) Patent No.: US 7,119,942 B2
(45) Date of Patent: Oct. 10, 2006

(54) SIDE SPRING MICRO-MIRROR

(75) Inventors: Harvey C. Nathanson, Pittsburgh, PA (US); Robert S. Howell, Silver Spring, MD (US); Garrett A. Storaska, Reston, VA (US); John B. Goodell, Baltimore, MD (US); Stephen D. Vancampen, Clarksville, MD (US)

(73) Assignee: Northrop Gruman Corporation, Los Angeles, CA (US)

( * ) Notice: Subject to any disclaimer, the term of this patent is extended or adjusted under 35 U.S.C. 154(b) by 0 days.

(21) Appl. No.: 10/879,040

(22) Filed: Jun. 30, 2004

(65) Prior Publication Data
US 2006/0012850 A1    Jan. 19, 2006

(51) Int. Cl.
*G02B 26/00* (2006.01)

(52) U.S. Cl. .................................................. 359/291

(58) Field of Classification Search ................ 359/290, 359/291, 292, 214, 223, 224, 318, 320, 324
See application file for complete search history.

(56) References Cited

U.S. PATENT DOCUMENTS

| 3,746,911 A | 7/1973 | Nathanson et al. |
| 5,083,857 A | 1/1992 | Hornbeck |
| 5,748,172 A | 5/1998 | Song et al. |
| 5,953,151 A | 9/1999 | Hewlett |
| 6,356,378 B1 * | 3/2002 | Huibers ............... 359/291 |
| 6,577,431 B1 * | 6/2003 | Pan et al. ............. 359/280 |
| 6,724,509 B1 | 4/2004 | Lee |

* cited by examiner

*Primary Examiner*—Hung Xuan Dang
*Assistant Examiner*—Tuyen Tra
(74) *Attorney, Agent, or Firm*—Birch, Stewart, Kolasch & Birch, LLP

(57) ABSTRACT

A micro-electrical mechanical system (MEMS) mirror assembly including an array of micro-mirrors formed on a substrate and having springs on one side and which angularly tilt between ON and OFF states in response to an electrostatic force generated by a voltage applied to an electrode located on the substrate. At least one, but preferably two springs in the form of two thin strips of metal attach to post(s) at the side edge of the mirror and act as springs which provide a restoring force when the mirror is tilted between an OFF state which occurs when the mirror is flat relative to the substrate with no voltage applied, and in the ON state when the mirror is tilted when a voltage is applied.

16 Claims, 6 Drawing Sheets

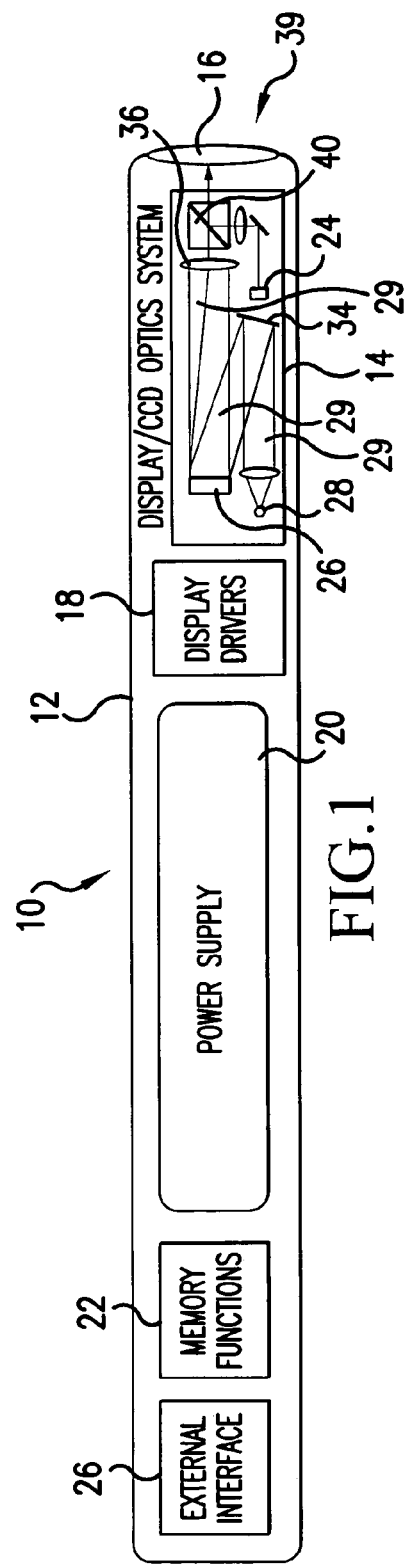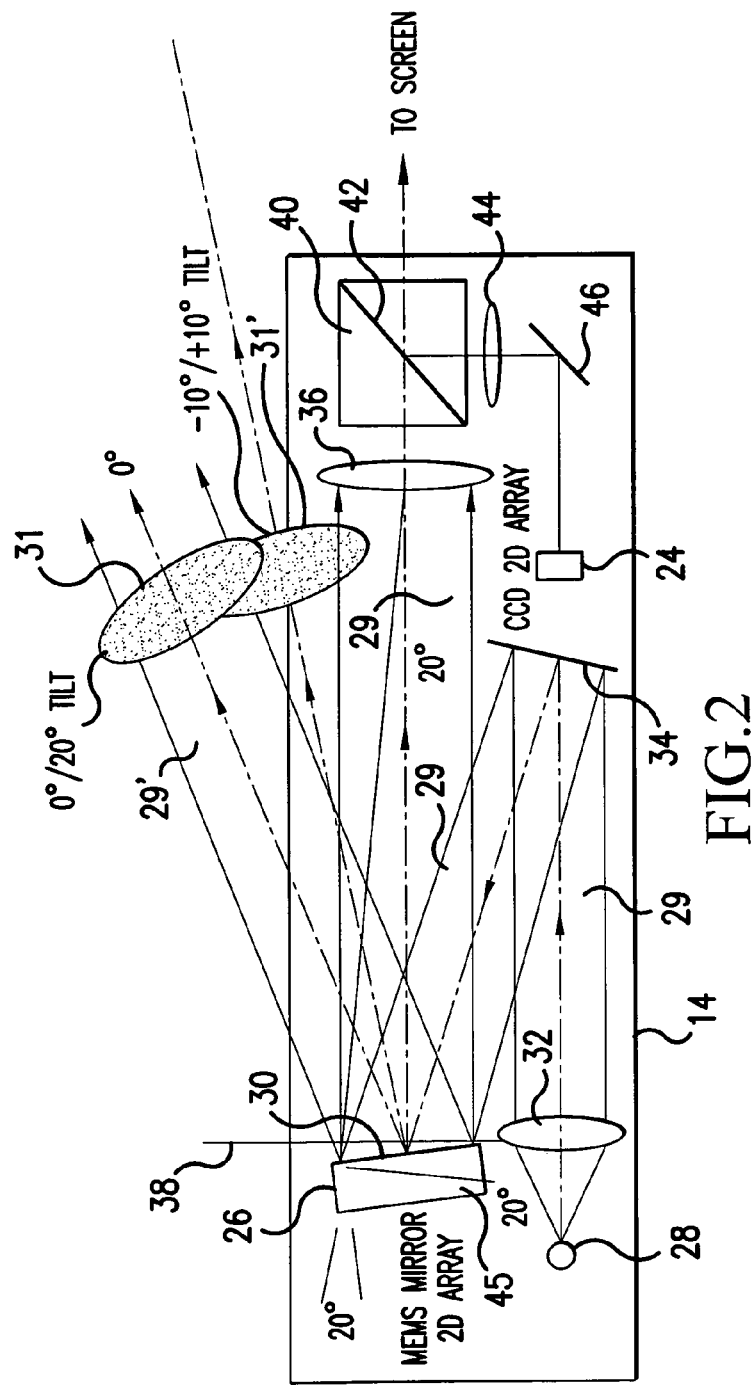

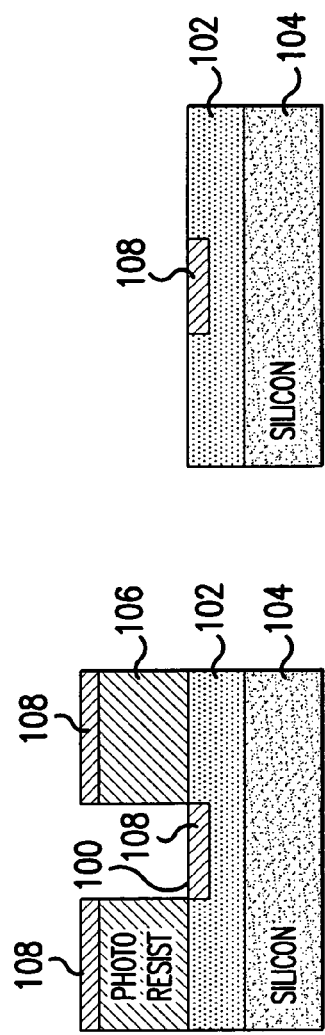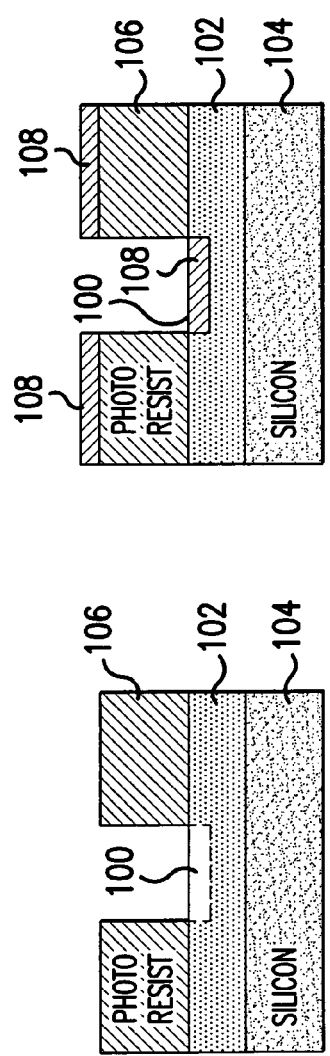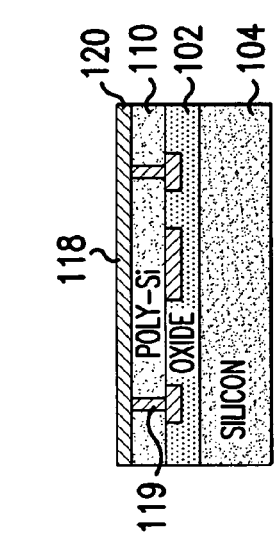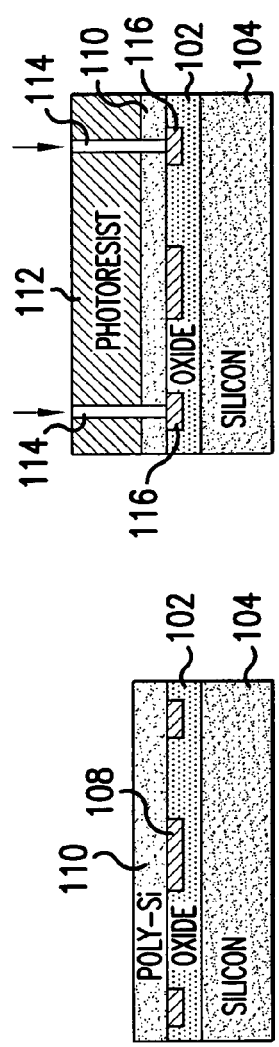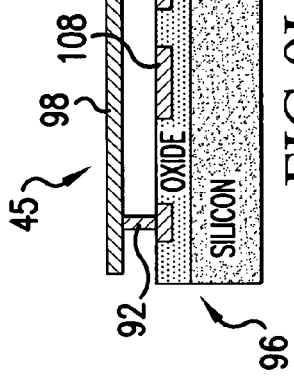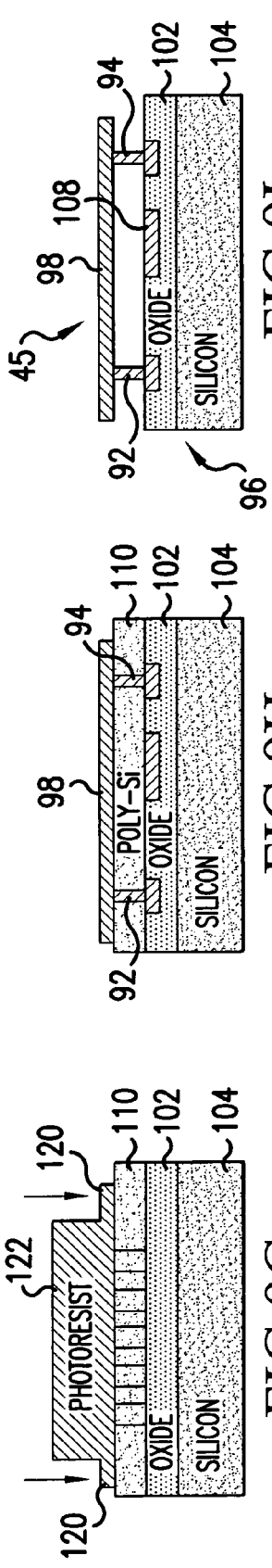

SIDE SPRING MICRO-MIRROR

GOVERNMENT INTEREST

The Defense Advanced Research Project Agency of the U.S. Government has an interest in this invention pursuant to Contract No. NBCH030046.

CROSS REFERENCE TO RELATED APPLICATION

This invention is related to U.S. Ser. No. 10/879,041 (Northrop Grumman Ref. No. 000258-078), entitled "Pocket Pen Ultra-High Resolution MEMS Projection Display In Combination With On Axis CCD Image Capture System", filed on Jun. 30, 2004, in the names of Harvey C. Nathanson et al. and which is assigned to the assignee of the present invention.

BACKGROUND OF THE INVENTION

This invention relates generally to a micro-mirror for a micro-mirror array, and more particularly to a micro-mirror which can be angularly tilted in conjunction with a light source so as to project an image onto a screen.

FIELD OF THE INVENTION

In the related application referenced above, a portable pen-sized projector/image grabber system is disclosed that utilizes a high resolution MEMS mirror array in conjunction with a light source so as to project an image on a screen. The MEMS mirror array is comprised of micro-mirrors in the order of 5 μm×5 μm on a side so as to form a target small enough to be used in a pen-sized, hand-held portable housing.

SUMMARY

This invention is directed to a micro-mirror having a side spring geometry, and more particularly to a micro-electrical mechanical system (MEMS) mirror having springs on one side of the mirror and which angularly tilts between ON and OFF states through electrostatic actuation. At least one, but preferably two springs in the form of two thin strips of metal attach to post(s) at the side edge of the mirror and act as springs which provide a restoring force when the mirror is tilted between an OFF state which occurs when the mirror is flat with no voltage applied, and in the ON state when the mirror is tilted in response to an applied voltage.

In one aspect of the invention, a micro-mirror for use in a MEMS mirror array is disclosed comprising: a generally flat mirror body member having a plurality of side edges, said body member being suspended above the substrate only on a single side edge by at least one spring member and which provides a restoring force to the mirror body member back to a flat OFF state when pulled downwardly by an actuating force to a tilted ON state.

Further scope of applicability of the present invention will become apparent from the detailed description provided hereinafter. It should be understood, however, that the detailed description and the specific examples, while indicating preferred embodiments of the invention, are provided by way of illustration only, since various changes and modifications coming within the spirit and scope of the invention will become apparent to those skilled in the art.

DRAWINGS

The present invention will become more fully understood from the detailed description provided hereinafter in the accompanying drawings which are provided by way of illustration only, and thus are not limitative of the present invention, and wherein:

FIG. 1 is a longitudinal cross-sectional view of a pocket pen-sized housing which includes an image projection/image capture system;

FIG. 2 is a partial longitudinal cross-sectional view of the optic system shown in FIG. 1 including an array of micro-mirrors in accordance with the subject invention;

FIGS. 9A–9I are illustrative of a set of method steps for fabricating a micro-mirror in accordance with the subject invention.

DETAILED DESCRIPTION OF THE INVENTION

Figure 3:
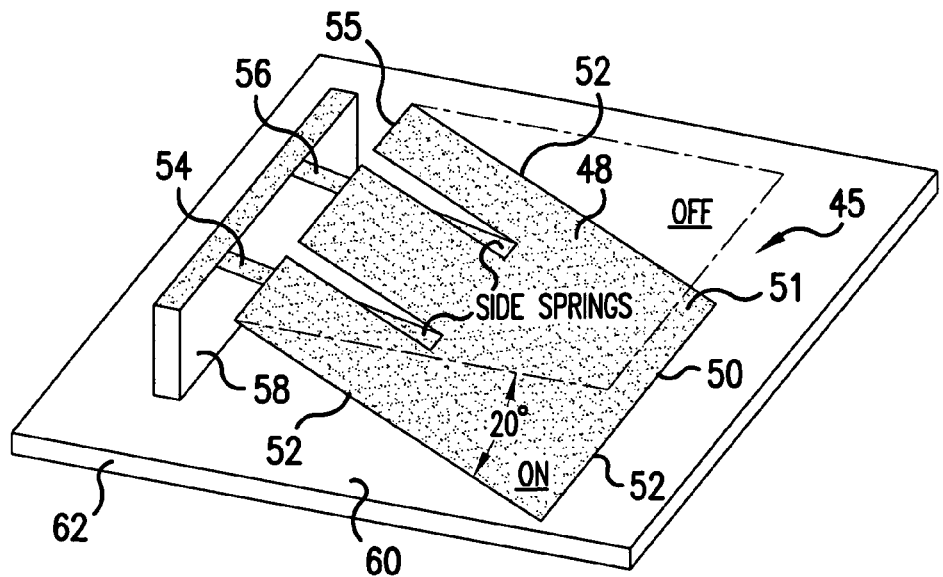
FIG. 3 is a perspective view of an embodiment of a micro-mirror in accordance with the subject invention including two side spring elements.

Referring now to the drawings, attention is first directed to FIG. 1 where there is shown a pocket-pen sized projector-image grabber device 10 in accordance with the invention shown and described in the related application, Ser. No. 10/879,041 entitled "Pocket Pen Ultra-High Resolution MEMS Projection Display . . . ". FIG. 1 is broadly illustrative of the components which, in addition to an elongated cylindrical pocket pen type housing 12, include an image projection and image grabber system 14 shown in detail in FIG. 2, and which resides behind an objective lens 16. Behind the system components 14, is a display driver section 18 for controlling the image projector and image grabber system 14. In order to power the various electrical components, a power supply 20 consisting of one or more DC batteries is located in the housing 12. Also associated with the image projector and image grabber system 14, is a memory section 22 which is adapted to interface with a two dimensional CCD imaging array 24. The housing 12 also includes an external interface section 26 which includes an RF transmitter/receiver section, not shown, for transmitting images to an external location as well as receiving images therefrom for projection by the device 10.

Referring now to FIG. 2, the apparatus 14 shown in FIG. 1 includes, in addition to the CCD imaging array 24, a high resolution 1024×768 MEMS mirror array 26 and a light source 28 which projects a beam of light 29 to the face 30 of the array 26 by means of a condensing lens 32 and a folding mirror 34. The MEMS mirror array 26 is composed of a plurality of micro-mirrors which will be described hereinafter and which are tiltable along an edge so as to either reflect the light beam 29 to a projection lens 36, or off to the side as shown by reference numeral 29', where it is absorbed without being directed to the lens 36. As shown in FIG. 2, the mirror array 26 is tilted away from an axis 38 such that a tilt of the various mirrors from a 0° (flat) OFF state to a 20° (tilt) ON state as provided, for example, through electrostatic actuation, will project light towards the lens 36.

The impact of the above can be described by comparing the side spring mirror array 26 to a design that operates between, for example, −10° for its OFF and ON states. There is a certain amount of diffraction 31' centered at 0° caused by the fixed pattern noise of the array and substrate itself. When the mirror has an OFF state at 0°, this diffraction 31' is thrown out of the optical system, but when the OFF state is at −10°, a portion of this diffracted light energy at 0° will be captured by the projection lens 36 and thus reduce the resulting contrast between the ON and OFF state. This is demonstrated in FIG. 2, which shows an implementation of the micro-mirrors into the pen sized projector/image grabber optical system, and shows the diffraction spread from mirror's tilting between 0° and 20° and −10° and 10°.

The MEMS mirror, array 26 is comprised of a plurality of identical micro-mirrors which are only about 5 µm×5 µm along a side dimension, which forms an imaging target of about 0.5 cm.×0.4 cm. so that it is small enough to be inserted in the pen-sized hand-held device 10 shown in FIG. 1.

In order that the MEMS mirror array 26 and the CCD imaging array 24 have access to the same external port 39 including the objective lens 16 shown in FIG. 1, the apparatus 14 also includes an optical component 40 which may be, for example, a beam splitter, which permits light to be projected from the MEMS mirror array 26 to a projection screen, not shown, and so that an external scene or object can be conveyed to the CCD imaging array 24 by means of the reflecting face 42 in the beam splitter 40, a secondary objective lens 44, and a folding mirror 46.

Up to this point, what has been shown and described is a portable pen-sized image projector/image grabber system including a high density MEMS micro-mirror array, the details of which will now be explained.

Each micro-mirror 45 in accordance with this invention comprises a MEMS mirror design with at least one, but preferably two, spring elements on one side of the mirror, as will be shown in FIGS. 3–8. The side spring mirror in its various embodiments, is adapted to toggle OFF and ON between 0° (flat) and 20° (tilted) through electrostatic action. The method of switching between ON and OFF states can either use two electrodes beneath the mirror to actively actuate the mirror between ON and OFF states, or use a single electrode in conjunction with a spring constant of the springs as a restoring force to actuate between ON and OFF states. However, even where two electrodes are used to activate a mirror, the spring(s) also operate to provide a restoring force back to the 0° state.

FIG. 3 broadly depicts the architecture of a side spring micro-mirror 45 wherein a generally flat planar mirror body member 50 having a generally rectangular light reflective surface area 51 with straight side edges 52 and which is suspended only on one single edge 55 by two thin strips of metal 54 bonded to a post or support member 58 located on a surface 60 of a substrate 62. The two thin strips of metal 54 and 56 form parts of the mirror and extend from the support member 58 into the mirror body 50 at a predetermined distance such as approximately half way to provide a restoring force against an applied downward electrostatic attraction generated in the substrate 62, such that an OFF state occurs when the mirror 45 is substantially horizontal to the surface 60 of the substrate when no voltage applied, and in the ON state when the mirror is tilted downward due to the applied voltage as shown, which in the preferred embodiment, is on or about 20°, in order to achieve a result such as shown in FIG. 2.

Figure 4B:
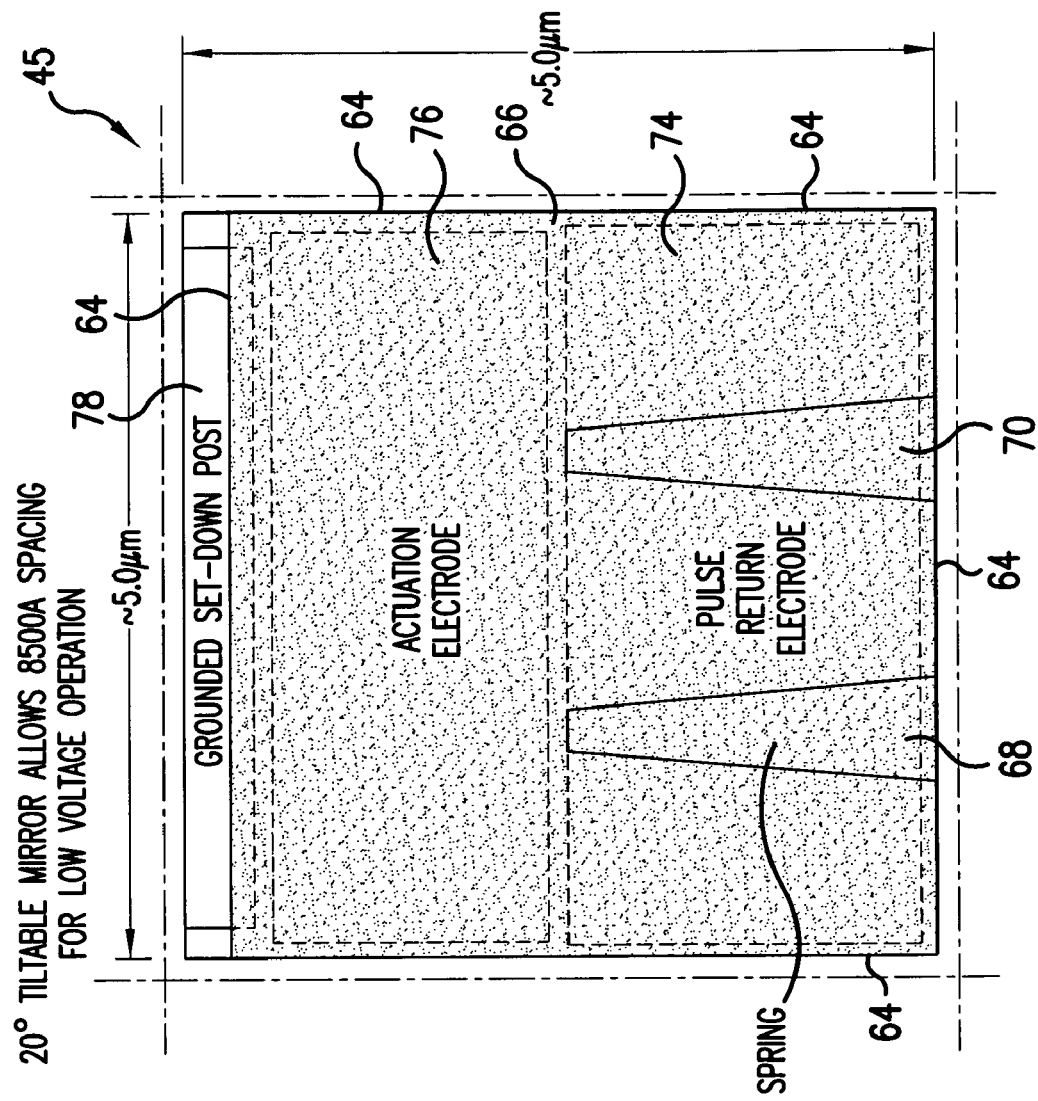
FIGS. 4A and 4B are side and top elevational views illustrative of another micro-mirror in accordance with the subject invention.
Figure 4A:
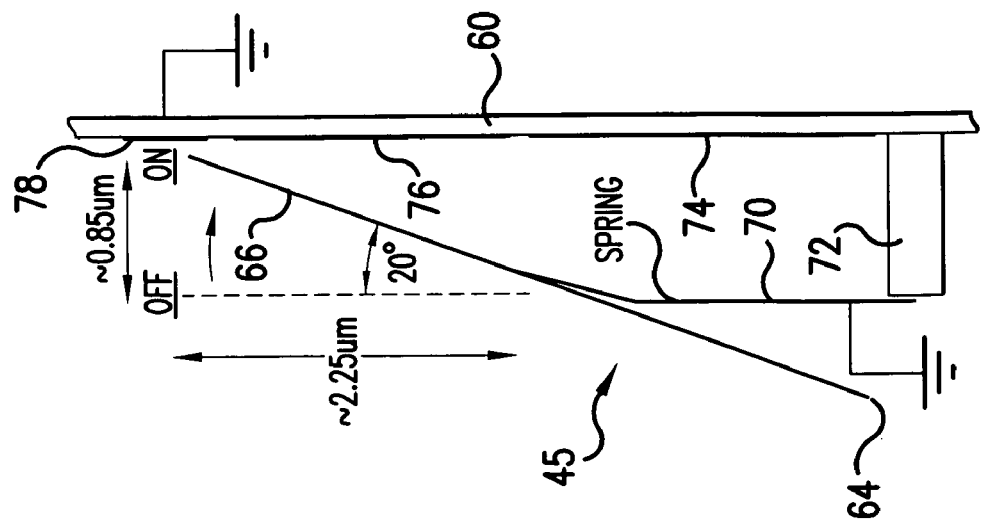

FIGS. 4A and 4B are illustrative of another embodiment of a two spring micro-mirror 45 in accordance with the subject invention and one which comprises a generally rectangular planar mirror body 64 having a light reflective surface 66 and having dimensions approximately 5.0 µm on a side. Two spring members shown by reference numerals 68 and 70 are attached to a post member 72. The spring members 68 and 70 are shown in FIG. 4B as being tapered and extending inwardly to approximately one half the side dimension and covering a pulse return electrode 74 formed on the surface of the substrate 60 as shown in FIG. 4A. An actuation electrode shown by reference numeral 76 is also formed on a surface of the substrate 60 beyond the ends of the springs 68 and 70. Also shown in FIGS. 4A and 4B is a grounded sit-down post member 78 which is located at the far opposite end of the mirror body 64.

As shown in FIG. 4A, the mirror body member 64 of the micro-mirror 45 is actuated from an OFF position where the body member 64 is parallel to the substrate 60 to a tilted ON position at an angle of 20° which for the dimensions shown, is approximately 0.85 mm. A 20° tiltable micro-mirror 45 as shown in FIGS. 4A and 4B, allows an array of mirror elements 64 to be fabricated having a 8500 Å spacing between their elements for low voltage operation.

A side spring mirror, as shown for examples in FIGS. 4A and 4B, with its OFF state at 0° and its ON state at 20°, provides a particularly useful angle officially separated from the OFF state for optical systems and has a number of advantages when used in an optical system.

Figure 5A:
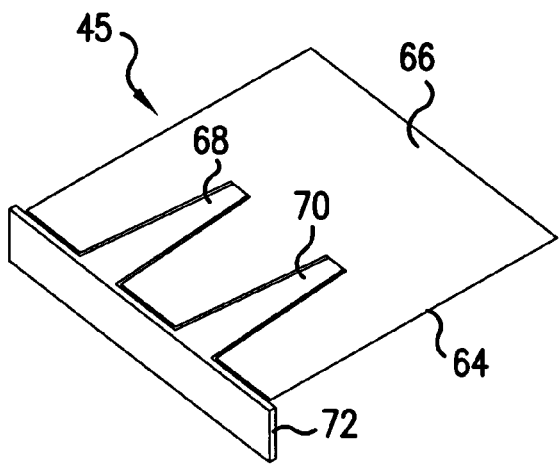
FIGS. 5A and 5B are illustrative of a two spring embodiment and a single spring embodiment of the micro-mirror shown in FIGS. 4A and 4B.
Figure 5B:
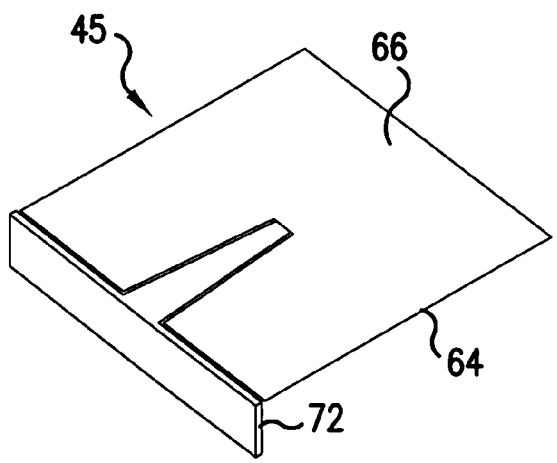

With reference to FIGS. 5A and 5B, FIG. 5A discloses a two spring embodiment such as shown in FIG. 4B in conjunction with the mirror body 64, while FIG. 5B shows a single spring embodiment for a mirror body 64.

It should be noted that either configuration may be utilized, however, the preferred embodiment comprises a two spring design shown in FIG.5A.

Figure 6:
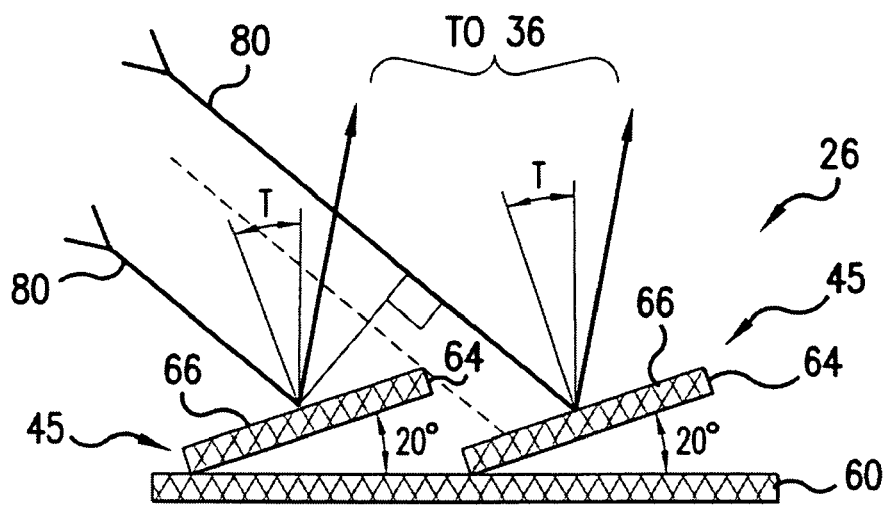
FIG. 6 is illustrative of two side spring micro-mirrors tilted at an angle of 20°.

Referring now to FIG. 6, shown thereat is a side view of two side spring micro-mirrors 45 as shown, for example, in FIGS. 4A and 4B tilted at 20°. The mirrors 45 are shown in the ON orientation, being that they are tilted so as to reflect collimated light, shown by reference numeral 80, incident on the MEMS mirror surfaces 66 into a projection lens, such as shown by reference numeral 36 in FIG. 2. The diffraction resulting from the MEMS micro-mirrors 64 is a result of two sources: (1) the mirror surfaces themselves with features and patterns such as springs 68 and 70 shown, for example in FIG. 4B; and (2) the array of mirror elements which in themselves form pixel surfaces having regular spacing therebetween and forming a pattern. The light diffracted from a single micro-mirror 45 has its central maximum in the specular reflection direction. The situation is more complex when considering interference between mirror elements 45, but this is less critical for the side spring mirror design as shown for the following reasons. First, in the OFF condition, all of the mirror elements or pixels remain untilted and the side spring micro-mirrors closely resemble a plain mirror. This minimizes diffraction cone angle. Further any angular mismatch is unimportant, since the light is OFF light. In the ON condition, during imaging the mirror elements are randomly tilted, thus significantly reducing interference effects. Most significant is the fact that the projector end lens, for example the lens 36 shown in FIG. 2, images each pixel into its conjugate, which completely eliminates interference effects in a final image plane.

Another advantageous feature specific to the subject micro-mirror architecture that employs side spring mirrors 45, is that because these side spring actuated pixels tilt only in one direction and otherwise lie flat, they have less unwanted reflection from the edges of the mirrors. In the OFF condition, the five μm square pixels as shown in FIG. 4B, for example, have gaps of 8500 Å between their edges. When turned ON, the pixels tilt toward the incident light beams so that no spurious edges intercept the incident light 80 as shown in FIG. 6. This architecture significantly reduces scattering in the ON and OFF conditions and is of significant advantage for a side spring MEMS mirror design as shown and described herein.

Figure 7:
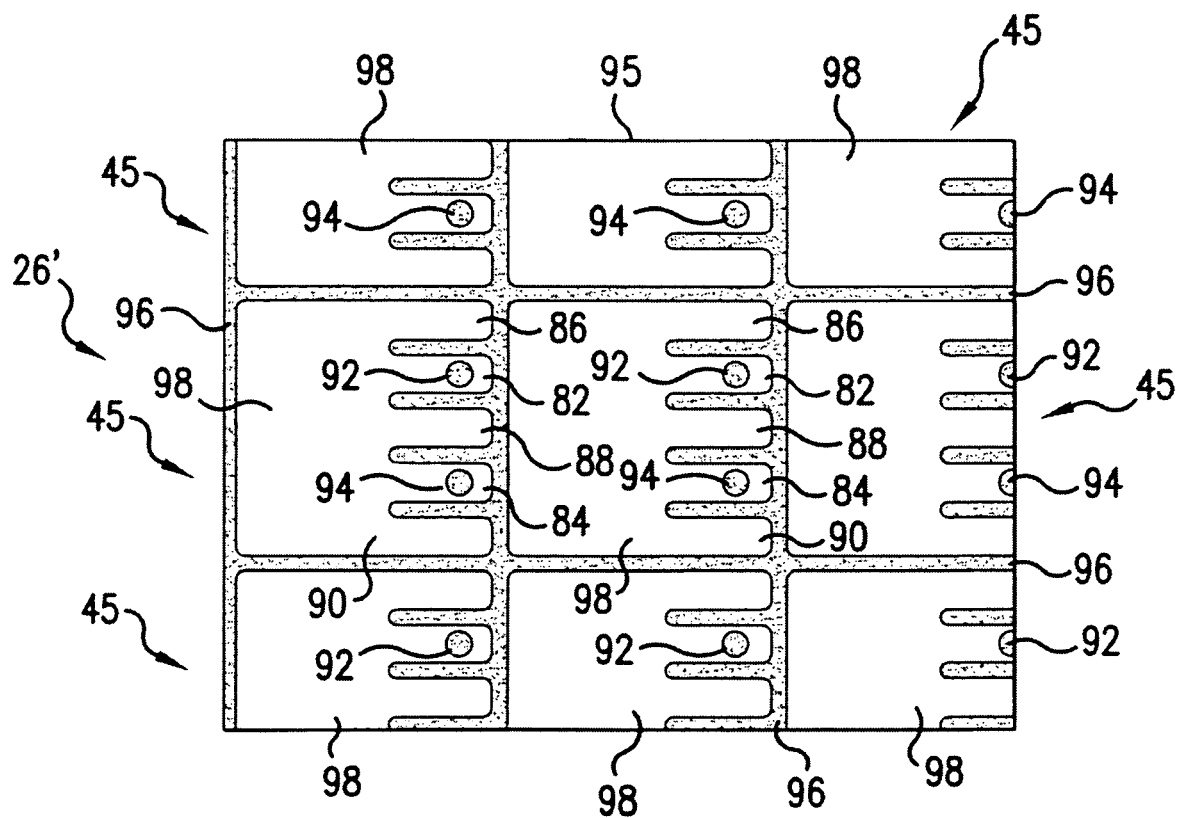
FIG. 7 is a scanning electron microscopy (SEM) image illustrative of a set of fabricated, freestanding micro-mirrors in accordance with another embodiment of the subject invention arranged in an array.
Figure 8:
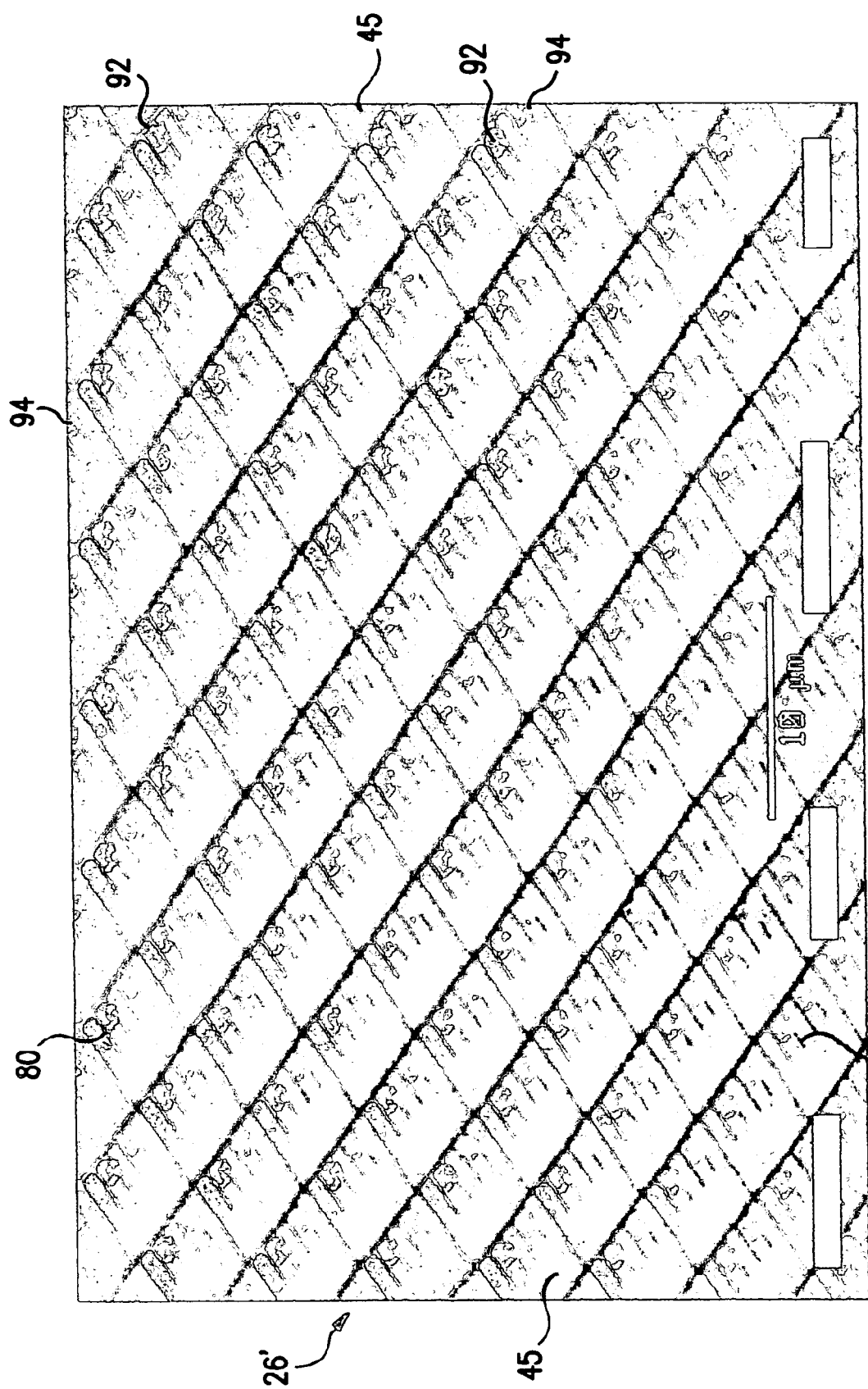
FIG. 8 is a SEM image illustrative of an enlarged array of freestanding micro-mirrors shown in FIG. 6.

Referring now to FIGS. 7 and 8, shown thereat is an E-beam defined array 26' of side spring MEMS mirror element 45 in accordance with another embodiment of the invention having 5000Å vias and 1500Å spacing, and are similar to the two spring embodiments shown in FIGS. 4A and 4B, with the exception that the pair of springs 68 and 70 shown in FIG. 4B are now shown in FIG. 7 as being generally rectangular elongated finger members 82 and 84 having a length which is less than one half of the length dimension 95 of the mirror body 95 and which are attached to posts 92 and 94 formed on the substrate 96 located between three unattached outer and inner finger members 86, 88 and 90 which tilt along with the main portion of the mirror body 98.

Referring now to FIGS. 9A–9I, shown thereat are a series of steps for fabricating a side spring micro-mirror 45 in accordance with the subject invention. FIG. 9A shows a trench 100 first being etched into a layer of oxide 102 which has been formed on a silicon substrate 104, with the trench being defined by a layer of photoresist 106. Next, as shown in FIG. 9B, electrode metal 108 is deposited on top of the photoresist layer as well as the trench 94. Following this, the photoresist layer 106, with the metallization removed, leaving only the metal electrode 108. Next, as shown in FIG. 9D, a layer of polysilicon 110 is deposited, which is followed by the step shown in FIG. 9E of the formation of posts 92 and 94 (FIG. 7) by applying a layer of photoresist 112 and forming vertical openings or vias 114 down to metallization regions 116. This is followed by mirror 118 and post 119 metal deposition step as shown in FIG. 9F by applying a layer of metallization 120 on top of the polysilicon layer 110 and through the vias 114 of FIG. 9E. Next, as shown in FIG. 9G, a field etch step is next carried out by applying a layer of photoresist 122 on top of the layer of metallization 120, which is followed by defining the micro-mirror reflecting surface of the micro-mirror body 98. This is then followed up by removing the polysilicon layer 110 as shown in FIG. 9I so as to provide a micro-mirror body 98 which is attached to a pair of posts 92 and 94 for the springs 82 and 84 shown in FIG. 7.

Thus what has been shown and described is a side spring micro-mirror design that can achieve XGA (1024×768) resolution in a 0.5 cm.×0.4 cm. footprint while also being designed for low voltage (<10V) voltage operation and capable of full color television refresh rates, with each of these features being adapted for location in the body 12 of a small hand-held projection system 10 as shown in FIG. 1.

The invention claimed is:

1. A micro-mirror for use in a MEMS mirror array comprising:
   a generally flat mirror body member including a light reflective surface and having a plurality of rectilinear side edges defining width and length dimensions of the mirror body member,
   said body member being suspended above a substrate only on one width dimension side edge by a pair of equal length spring members which comprise an integral portion of said body member and which are equally spaced from the length dimension side edges and extend inwardly of said body member a distance of aprroximately one-half of the length dimension of the side edges and operate to provide a restoring force to the mirror body member to a substantially flat OFF state when tilted along said side edge to an ON state by an electrostatic pull down force generated by an actuation electrode located on the substrate forwardly adjacent an inner end portion of said spring members.

2. The micro-mirror according to claim 1 wherein said spring members are tapered inwardly from said one width dimension side edge.

3. The mirror element according to claim 1 wherein said body is on or about 5 μm×5 μm along a side dimension.

4. The mirror element according to claim 3 wherein said array includes about 1024×768 mirror elements.

5. The mirror element according to claim 4 wherein said array of mirror elements form a light reflective target of about 0.5 cm×0.4 cm.

6. The mirror element according to claim 5 wherein said target is located in a pocket pen sized housing for use with a portable image projection system.

7. The micro-mirror according to claim 1 and additionally including a return electrode for an actuation pulse applied to an actuation electrode and located on the substrate adjacent the actuation electrode beneath said pair of spring members.

8. The micro-mirror according to claim 7 and additionally including a grounded set-down member for the mirror body located on and extending across the substrate adjacent the actuation electrode and the other width dimension side edge of the mirror body.

9. The micro-mirror according to claim 1 wherein the array is located in a portable housing.

10. The micro-mirror according to claim 9 wherein the housing comprises a pocket-pen sized housing.

11. The micro-mirror according to claim 1 and additionally including a grounded set-down member for the mirror body located on and extending across the substrate adjacent the actuation electrode and the other width dimension side edge of the mirror body.

12. A deflectable mirror element for an array of mirror elements, comprising:
    a generally rectangular planar mirror body having a light reflective surface, and side edges defining a width dimension and a length dimension, and additionally including a plurality of substantially equal length and equal width finger members formed in mutually parallel relationship along one of said width dimension side edges of said body above a substrate and having a length less than one-half of a length dimension side edge; and
    wherein a pair of said finger-like members are attached to a respective post adjacent said width dimension side edge, and the remaning finger-like members of said plurality of finger-like members are located on either side of said pair of finger-like members, said pair of finger-like members maintaining said mirror body in a first position substantially parallel to said substrate in an unactuated OFF state and for acting as springs so as to provide a restoring force to said mirror body back to said first position when tilted at a predetermined angle along said one width dimension side edge to a second position in an actuated ON state.

13. The mirror element according to claim 12 wherein said mirror body comprises a MEMS mirror element.

14. The mirror element according to claim 12 and additionally including an actuation electrode located on the substrate forward of the finger-like members for generating an electrostatic pull down force for tilting the mirror body to the ON position.

15. The mirror element according to claim 14 wherein said planar mirror is tilted downward toward the substrate in the ON position at an angle of about 20°.

16. The mirror element according to claim 14 and additionally including an actuation pulse return electrode located on the substrate adjacent the actuation electrode and beneath the finger-like members.

* * * * *